(12) United States Patent
Zhang

(10) Patent No.: US 7,664,051 B2
(45) Date of Patent: Feb. 16, 2010

(54) METHOD FOR IMPLEMENTING VIRTUAL NETWORK ELEMENT AND SYSTEM THEREOF

(75) Inventor: Yong Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 11/578,449

(22) PCT Filed: May 26, 2005

(86) PCT No.: PCT/CN2005/000733

§ 371 (c)(1),
(2), (4) Date: Jul. 16, 2007

(87) PCT Pub. No.: WO2005/117349

PCT Pub. Date: Dec. 8, 2005

(65) Prior Publication Data

US 2007/0297345 A1    Dec. 27, 2007

(30) Foreign Application Priority Data

May 26, 2004    (CN)    ................. 2004 1 0044390

(51) Int. Cl.
*H04L 12/28* (2006.01)
(52) U.S. Cl. ................ 370/254; 370/400; 370/401; 709/223; 718/1
(58) Field of Classification Search ............... None
See application file for complete search history.

(56) References Cited

U.S. PATENT DOCUMENTS

| | | | |
|---|---|---|---|
| 5,608,720 A | 3/1997 | Siegel et al. | |
| 6,643,267 B1 | 11/2003 | Karia et al. | |
| 7,170,862 B1 * | 1/2007 | Mountcastle | 370/254 |
| 7,206,314 B2 * | 4/2007 | Liao et al. | 370/401 |
| 7,330,722 B1 * | 2/2008 | Kirtley et al. | 455/423 |
| 7,412,701 B1 * | 8/2008 | Mitra | 718/1 |
| 7,415,507 B1 * | 8/2008 | Ward et al. | 709/217 |
| 7,466,710 B1 * | 12/2008 | Clemm et al. | 370/401 |
| 2001/0049686 A1 * | 12/2001 | Nelson et al. | 707/103 X |
| 2002/0073355 A1 | 6/2002 | Cerami et al. | |
| 2002/0120720 A1 * | 8/2002 | Moir | 709/220 |
| 2002/0150108 A1 | 10/2002 | Nattkemper et al. | |
| 2003/0165144 A1 * | 9/2003 | Wang | 370/400 |
| 2004/0022256 A1 * | 2/2004 | Green | 370/401 |

(Continued)

OTHER PUBLICATIONS

Thurm et al, "Simulating ATM Network Management using Virtual Devices", 2000 IEEE, Apr. 10, 2000, pp. 773-786, XP010376723, chapter 2, p. 774-777.

*Primary Examiner*—Ayaz R Sheikh
*Assistant Examiner*—Peter Chau
(74) *Attorney, Agent, or Firm*—Conley Rose, P.C.; Grant Rodolph

(57) ABSTRACT

A method for implementing a virtual Network Element (NE), including: constructing type definition information of a virtual NE and a virtual board, which has all type parameters of an actual NE and board of the same type; obtaining the type definition information to construct a virtual NE entity and a virtual board entity which has property information of an actual NE; configuring service and protection information for the constructed virtual NE entity. A network management system for implementing a virtual NE is also disclosed. It is possible to construct and maintain a virtual NE which can simulate actual NE devices completely in accordance with the present invention.

11 Claims, 8 Drawing Sheets

U.S. PATENT DOCUMENTS

2004/0172574 A1* 9/2004 Wing et al. .................... 714/4
2004/0208292 A1* 10/2004 Winterbottom .......... 379/15.03
2005/0039180 A1* 2/2005 Fultheim et al. ............... 718/1
2005/0226430 A1* 10/2005 Kreifeldt et al. .............. 381/58
2005/0268338 A1* 12/2005 van der Made ............... 726/24
2006/0265483 A1* 11/2006 Wang et al. ................. 709/223

* cited by examiner

METHOD FOR IMPLEMENTING VIRTUAL NETWORK ELEMENT AND SYSTEM THEREOF

CROSS REFERENCE TO RELATED APPLICATIONS

This application is the U.S. national phase application of PCT Application No. PCT/CN05/00733, filed May 26, 2005 and entitled "Method for Implementing Virtual Network Element and System Thereof", which claims priority to the Chinese Patent Application No. 2004-10044390.9, filed on May 26, 2004 and entitled "Method for Implementing Virtual Network Element and System Thereof".

FIELD OF THE TECHNOLOGY

The present invention relates to the technique of virtual network element (NE) in an optical network, and more particularly, to a method for implementing a virtual White-box NE in a network management system of the optical network and a system thereof.

BACKGROUND OF THE INVENTION

In an optical network, such as a Synchronous Digital Hierarchy (SDH) and a Synchronous Optical Network (SONET), constituted by different manufacturers, each device provider would provide its own network element management system or sub-network management system for device maintenance and service allocation. At present, network element management systems or sub-network management systems of a manufacturer can not manage the devices of other manufacturers due to the differences among the devices of different manufacturers and the un-unified software interface standards adopted by different manufacturers. When devices of different manufacturers connect with each other, Multiplex Section Shared Protection Ring (MS SPRING), Linear Multiplex Section Protection (Linear MSP), Dual Node Interconnection (DNI), and etc are adopted to protect services. These protecting methods relate to devices of many different manufacturers in different management domains. Therefore, the problem that faces the network element management system and the sub-network management system is how the network element management systems and the sub-network management systems of different manufacturers effectively manage the above-mentioned services on the borders of sub-networks as well as the protection features in their own management domains.

To solve the problem, the method of configuring a virtual NE in the network element management system or the sub-network management system is usually adopted. The virtual NE is a kind of logic "NE" which is configured in the network element management system or in the sub-network management system, (both are referred to as network management system hereinafter), and is used to facilitate the management of services or protections in the network or in the sub-network by the network management system. The "NE" is usually used to simulate all or some of the management functions, such as services and protection functions of devices of one or more other manufacturers. It does not always correspond to a certain actual physical device in an actual network. The device maintenance and service allocation on the border of the network and the sub-network are made more convenient through the virtual NE, thereby enhancing the efficiency of device maintenance in the network and the sub-network.

In the prior art, the adopted simulation methods of virtual NE mainly are Black-box and Gray-box simulation methods.

The Black-box simulation method is shown in FIG. 1. One or more Black-box virtual NEs can be used to simulate one or more physical devices which are in sub-network 2 consisting of devices of manufacturer B and are outside the management domain of the network management system of sub-network 1, which consists of devices of manufacturer A.

In the Black-box simulation method, the Black-box virtual NE is only a constituent element of network topology. It is used to constitute the network topology with other topology elements, such as NEs and links. However, the Black-box virtual NE is not provided with internal service features, so it can not provide device management functions, such as device configuration, service, and protection, for the maintenance personnel of the network.

The Gray-box simulation method is shown in FIG. 2, which can also be used to illustrate the networking of White-box virtual NEs. As shown in FIG. 2, one or more Gray-box virtual NEs can be used to simulate one or more physical devices which are in sub-network 2 consisting of devices of manufacture B and are outside the management domain of the network management system of sub-network 1, which consists of devices of manufacturer A.

The Gray-box virtual NE is a constituent element of network topology while supporting some NE management functions, such as services. Compared with the Black-box virtual NE, the device simulation function provided by the Gray-box virtual NE is much stronger. For instance, the Gray-box virtual NE supports virtual NE service configuration, simple end-to-end circuit allocation, and etc. However, a Gray-box virtual NE can not simulate some complicated management functions, such as MS SPRING, Linear MSP and DNI protection, due to less information contained in the Gray-box virtual NE.

SUMMARY

In view of the above, the present invention provides a method and a system for implementing a virtual NetWork Element (NE).

The method for implementing a virtual NE includes the following steps:

constructing and storing virtual NE type definition information, enabling the virtual NE type definition information of each type to include all type parameters of an actual NE of the same type;

constructing and storing virtual board type definition information, enabling the virtual board type definition information of each type to include all type parameters of an actual board of the same type;

deciding the type of a virtual NE to be constructed;

reading the corresponding virtual NE type definition information;

constructing in the management objects data area a virtual NE entity, which has property information of an actual NE;

deciding the type of a virtual board to be constructed;

reading the corresponding virtual board type definition information;

constructing in a designated slot of the constructed virtual NE entity a virtual board entity which has property information of an actual board;

configuring service information and protection information for the constructed virtual NE entity; and implementing a virtual NE device maintenance and a service allocation by simulating the management features of an actual NE device.

The present invention further provides a network management system for realizing a virtual NE, including an application module, a foundational management module, a memory module which is used to store management objects data, a virtual NE definition module, a virtual NE device management module, a virtual NE service management module, a data access interface module, and an application interface module; wherein the virtual NE definition module is used to construct virtual NE type definition information and virtual board type definition information; store the constructed type definition information in the memory module through the data access interface module; and provide required type definition information to the virtual NE device management module;

the virtual NE device management module is used to obtain the virtual NE type definition information and the virtual board type definition information from the virtual NE definition module; and call the data access interface module to construct a virtual NE entity and a virtual board entity in a management objects data area of the memory module; and the virtual NE service management module is used to construct virtual NE entity service information and protection information in the management objects data area of the memory module through the data access interface module; and provide a service management and protection function for the application module through the application interface module.

From the above description, it can be seen that the method and the system for implementing a virtual NE provided by the present invention can construct a virtual NE entity and a board entity by simulating the actual NEs and can configure service information and protection information for the virtual NE.

DETAILED DESCRIPTION OF THE EMBODIMENTS

Figure 1:
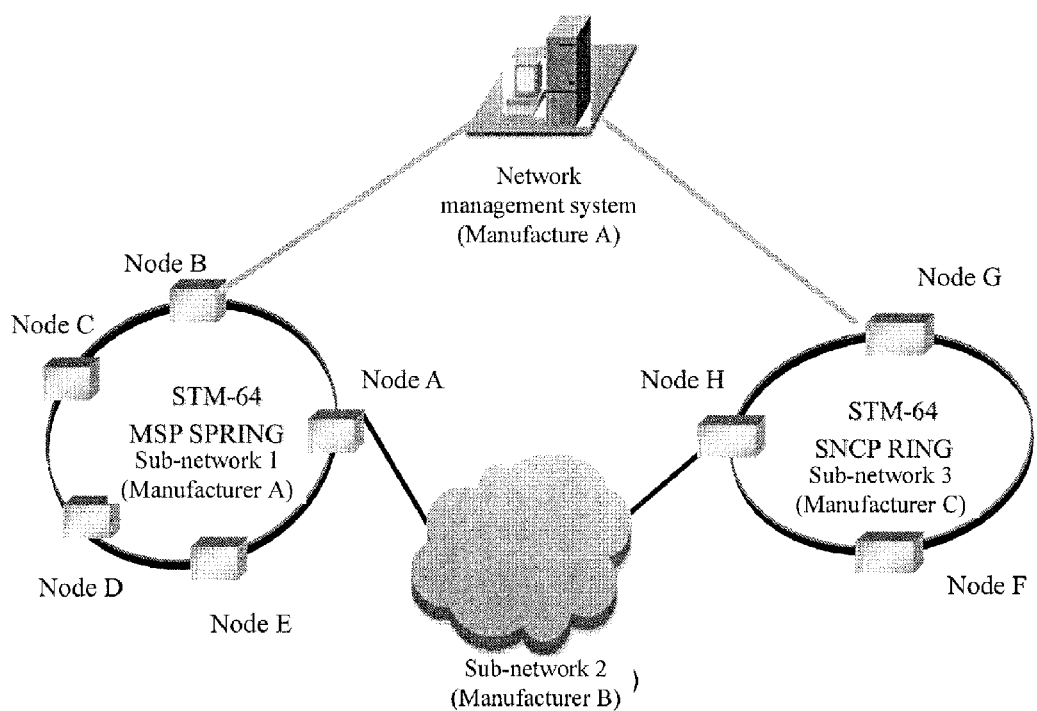
FIG. 1 is a schematic diagram illustrating the networking of Black-box virtual NEs.
Figure 2:
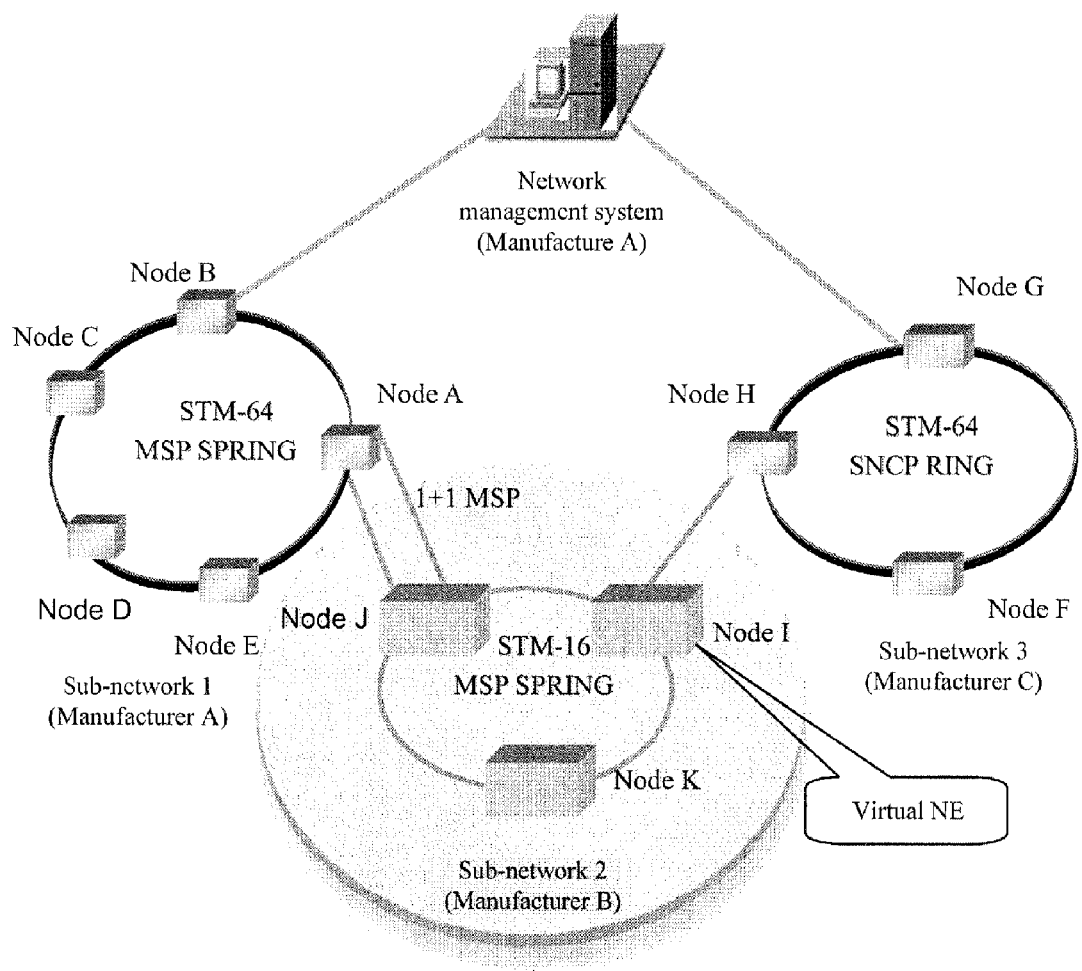
FIG. 2 is a schematic diagram illustrating the networking of Gray-box virtual NEs or White-box virtual NEs in accordance with an embodiment of the present invention.

The virtual NE implemented by the present invention refers to the White-box virtual NE. It can not only implement all the simulation functions of the Black-box virtual NE and the Gray-box virtual NE, but also simulate such functions as the protection of an actual NE device, a board installation, a complicated service configuration and etc. Besides the virtual NE possesses all the properties of an actual NE device, including an NE type, an NE ID, an NE name, NE coordinates, board definition, board installation information, service and protection information, and etc. An embodiment of networking the White-box virtual NEs in accordance with the present invention is shown in FIG. 2.

Figure 3:
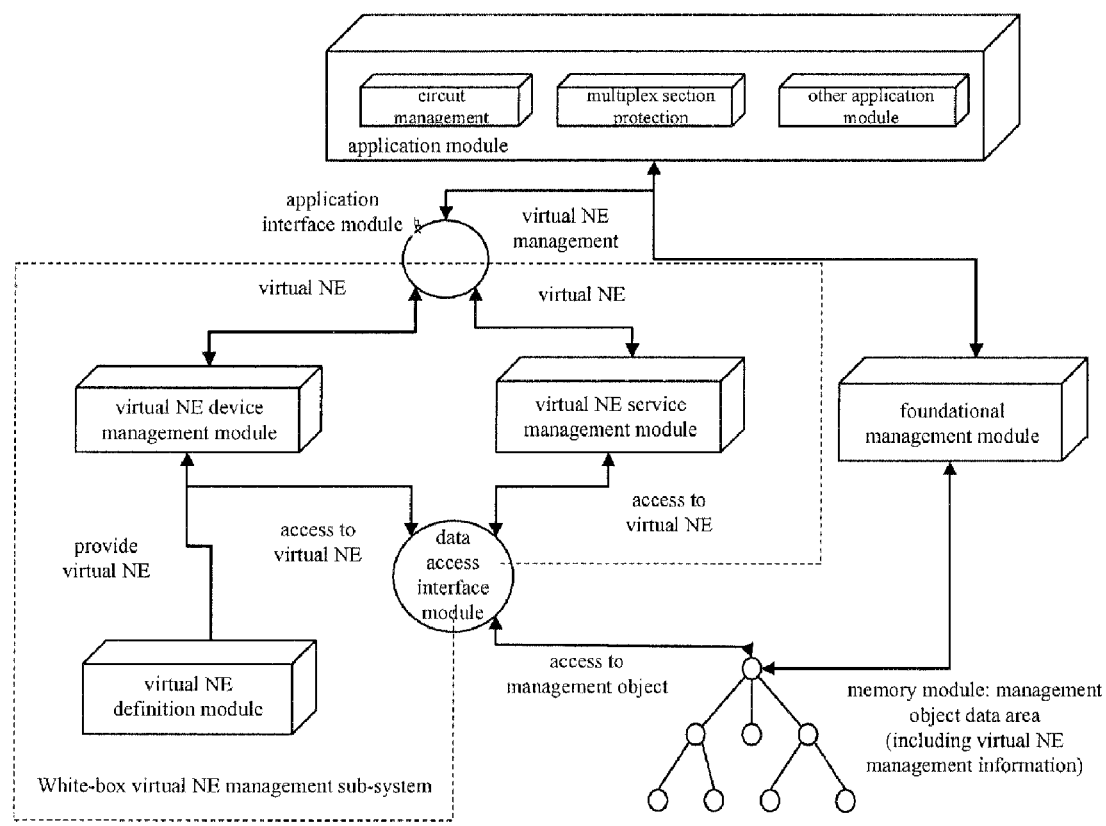
FIG. 3 is a schematic diagram of the network management system which implements White-box virtual NE in accordance with an embodiment of the present invention.

In order to construct and manage a White-box virtual NE, the structure of the network management system of the optical network put forward by an embodiment of the present invention is shown in FIG. 3. A White-box virtual NE management sub-system is added to the existing system which includes an application module, a foundational management module and a memory module used to store management objects data. The White-box virtual NE Management sub-system is used to provide definition, assignment and service management functions for the White-box virtual NE of the entire network management system, and also provide a software interface module to support each upper-layer application module of the network management software system, thereby transparently implementing the management functions of the virtual NE's topology, circuits, MS SPRING, and etc., as well as function simulation for NE which is not within the management domain so as to facilitate the network management.

The White-box virtual NE management sub-system in accordance with the present invention includes three functional modules and two interface modules. The functional modules include: a virtual NE definition module, a virtual NE device management module, and a virtual NE service management module while the interface modules include: an application interface module and a data access interface module.

To implement a White-box virtual NE, first, operators of the network management system need to define different types of virtual NEs through the virtual NE definition module. The virtual NE definition information can be stored in a data memory of the network management system as part of network management system data through the data interface module.

Then, the operators of the network management system can use the virtual NE definition information to construct a virtual NE management entity and the service information of the entity in the network management system through the virtual NE device management module and the virtual NE service management module. The constructed information is also stored in the data memory of the network management system through the data interface module. Besides, the information is the same as the information stored in other NEs in the network management system in the information format, except that it can not be transferred to physical network devices to control devices. Therefore, the network management system could store the virtual NE and the related service information together with the information of the NEs of other types.

Next, various application modules of the network management system, such as the circuit management module and the Multiplex Section Protection module, when allocating and managing the services of network devices, can access and control the information of virtual NE management entity, including NE information, board information, service information, and protection information of the virtual NE, through the application interface module and with the help of the virtual NE device management module and the virtual NE service management module. Compared with the Black-box virtual NE and the Gray-box virtual NE, the White-box virtual NE provides more information of the virtual NE, such as the service information and the protection information. Therefore, the interface provided by the application interface module to each application module is basically the same as the interface provided by other modules to each application module. Namely, each application module can carry out the service management and protection operations, such as allocating circuits, configuring protection, and etc., in a network including virtual NE, without differentiating the virtual NE from other NEs or making corresponding modifications.

Detailed description to each module of the White-box virtual NE Management Sub-system will hereinafter be given, respectively.

1. The Virtual NE Definition Module:

The virtual NE definition module can also be called virtual NE type management module and is used to construct type definition information of a virtual NE and a virtual board according to type parameters of the virtual NE and virtual board. The virtual NE definition module is also used to write and store the constructed type definition information in the memory module through the data access interface module, provide the required type definition information of the virtual NE or the virtual board for the virtual NE device management module, and manage and maintain the type definition information which is stored in the memory module through the data access interface module.

When being inputted, type parameters of each type of virtual NE and virtual board can be inputted to the network management system by a pre-defining or manually inputting method. Then the type definition information of various corresponding virtual NE and virtual board are generated by the virtual NE definition module according to the inputted type parameters, and the generated type definition information is stored in the memory module.

The pre-defining method is to store the type parameters of various types of White-box virtual NE and virtual board in the storage media within the network management system statically as a text file or a database record. When the network management system starts, the virtual NE definition module automatically reads the information and constructs the type definition information for management. The type definition information of the virtual NE and virtual board inputted in this way will remain un-changed during the operation of the network management system.

The manually inputting method includes: on a user interface provided by the network management system, operating personnel inputting the type parameters of the White-box virtual NE and virtual board into the network management system. The virtual NE definition module constructs the type definition information according to the inputted type parameters and then manages the information. The type definition information of the virtual NE and virtual board inputted in this way can be changed as required, including constructing, deleting and modifying the parameters, during the operation of network management system.

To define a virtual NE type, the type parameters required typically include: virtual NE type Identity (ID), virtual NE type name, virtual NE type, number of slots, interface rate, and NE functions, wherein, the virtual NE type ID is a unique ID that differentiates different virtual NE types. If the virtual NE type IDs of two virtual NEs are different, it means that the two virtual NEs belong to different types and have different functions.

While categorizing the types of the NE, different categorizing results can be obtained from different categorizing methods. An example of virtual NE type category categorized respective according to the device type, the maximum interface rate and the NE functions is shown in Table 1.

TABLE 1

| Categorizing method | virtual NE type |
| --- | --- |
| According to the device type | SDH virtual NE |
| | SONET virtual NE |
| According to the maximum interface rate | STM-1 virtual NE |
| | STM-4 virtual NE |
| | STM-16 virtual NE |
| | STM-64 virtual NE |
| | OC-3 virtual NE |
| | OC-12 virtual NE |
| | OC-48 virtual NE |
| | OC-192 virtual NE |
| According to the NE functions | Terminal Multiplex virtual NE |
| | Add Drop Multiplex virtual NE |
| | Digital cross connect virtual NE |

Different type parameters are needed for different NE type categorizing methods.

Upon deciding the NE type categorizing method, the virtual NE type information can be constructed for each needed type of virtual NE. The step of constructing virtual NE type information means to categorize and store together all the type parameters of the virtual NE of the same type systematically for use in being invoked when a virtual NE is constructed. Typically, the virtual NE parameters according to an embodiment of the present invention are completely the same as those of an actual NE of the same type.

To define a virtual board type, the type parameters required include: the virtual board type ID, virtual board name, interface type, interface rate, and number of interfaces, wherein the description of each related parameter is shown in Table 2.

TABLE 2

| Parameter | Description of parameter |
| --- | --- |
| Type ID | The unique ID which is used to differentiate different virtual board types in the network management system |
| Type name | Text displaying message of a board on the network management system interface, which is an identity for a user to differentiate different boards |
| Interface type | The type of access signal of the board: SDH interface board PDH interface board SONET interface board |
| Interface rate | The rate of access signal of the board: SDH interface board: STM-1, STM-4, STM-16, STM-64 and etc PDH interface board: E1, E2, E3, E4, T1, T2, T3, T4 and etc SONET interface board: OC-3, OC-12, OC-48, OC-192 and etc |
| Number of interfaces | The number of ports by which signals access the board |

Similarly, various categorizing methods can be adopted in categorizing different types of virtual board, and different type parameters are needed for different categorizing methods.

Upon deciding the categorizing method of board types, the virtual board type information can be constructed for each needed type of virtual board. The step of constructing virtual board type information includes categorizing and storing all the type parameters of the virtual board of the same type systematically for use in being invoked when constructing a virtual board.

The virtual NE definition module manages the type definition information of all types of virtual NE and virtual board, such that different kinds of type definition information of the virtual NE and the virtual board can be maintained in the same network management system. For example, different kinds of virtual NE type definition information, such as that of SDH and SONET, can be maintained in one network management system, and different kinds of virtual board type definition information, such as that of E1, STM-4, and OC-3, can also be maintained in one network management system at the same time. The type definition information of all these virtual NEs and virtual boards is provided and managed by the virtual NE definition module.

2. The Virtual NE Device Management Module:

The virtual NE device management module calls the data access interface module to construct a White-box virtual NE and a virtual board management entity in a management objects data area of the memory module using the type definition information of the virtual NE and the virtual board provided by the virtual NE definition module. The constructed White-box virtual NE and the virtual board management entity are to be used by the virtual NE service management module and other application modules in the network management system.

The virtual NE device management module implements configuration and management functions of the White-box virtual NE. A user can construct, delete and query the information of a White-box virtual NE and a virtual board according to the configuration conditions of actual network devices through this module.

When a virtual NE simulating an actual NE needs to be constructed, a user initiates a command for constructing a virtual NE and a virtual board through the network management system interface and inputs necessary parameters. The virtual NE device management module obtains the type definition information of the virtual NE and the virtual board of a designated type through the virtual NE definition module according to the information inputted by the user, then calls the data access interface module to construct the entities of an appropriate virtual NE and an appropriate virtual board in the management objects data area of the memory module, and returns the execution result of the command.

In addition, the virtual NE device management module supports deleting and querying functions of the virtual NE and the virtual board. The related input and output information when executing each function are shown in Table 3.

TABLE 3

| User-configured command | Input | Output |
| --- | --- | --- |
| Construct virtual NE | Virtual NE type ID Virtual NE ID NE name | Construct a related virtual NE entity or return a construction failure message |
| Delete virtual NE | Virtual NE ID | Return a delete success/failure message |
| Query virtual NE information | No | Output all virtual NE entity information in the management objects data area |
| Construct virtual board | Virtual NE ID Slot number Virtual board type ID Virtual board ID | Construct a related virtual board or return a construction failure message |
| Delete virtual board | Virtual NE ID Slot number | Return a delete success/failure message |
| Query virtual board information | Virtual NE ID | Output all virtual board information under the designated virtual NE in the management objects data area |

3. The Virtual NE Service Management Module:

The virtual NE service management module is used to actually construct service information and protection information of a virtual NE entity in the network management system, support the network management system to implement service and protection management and allocation across virtual NEs.

In the case that the constructed virtual NE entity is used to simulate the actual service and protection, the user initiates a command to construct a virtual NE service or a protection and inputs necessary parameters on the interface of network management; then the virtual NE service management module calls the virtual NE data access interface to construct related service and protection information in the corresponding virtual NE entity in the management objects data area according to the information inputted by the user and returns an execution result of the command.

The virtual NE service management module also supports the deleting and querying functions for a service and protection in the virtual NE. The related input and output information when each function is performed are as shown in Table 4.

TABLE 4

| User-configured command | Input | output |
| --- | --- | --- |
| Construct service | Virtual NE ID, service ID, service source (including slot number, port number, channel number, time slot number) service destination (including slot number, port number, channel number, time slot number), service primary/secondary ID | Construct a related service or return a construction failure message |
| Delete service | Virtual NE ID Service ID | Return a delete success/failure message |
| Query service information | Virtual NE ID | Output all service information of a designated virtual NE in the management objects data area |
| Construct protection | Virtual NE ID, protection ID, protection type, protection mapping (including mapping direction, slot number, port number, channel number), protection waiting resuming time, protection resuming mode | Construct a related protection or return a construction failure message |
| Delete protection | Virtual NE ID Protection ID | Return a delete success/failure message |
| Query protection information | Virtual NE ID | Output all protection information of a designated virtual NE in the management objects data area |

When a virtual NE has the service and protection information, it can simulate the management features of an optical transport NE which is not in the management domain, thereby facilitating the network management.

4. The Data Access Interface Module, Which Can Also Be Called Virtual NE Data Access Interface Module:

The data access interface module is the interface between the virtual NE Management Sub-system and the network management system objects data area, used to simulate a virtual NE Management Sub-system to obtain and access various configuration data of the virtual NE entity in the network management system.

The access operations provided by the data access interface module include: construct, delete and query; the access objects provided include: virtual NE configuration information, virtual board configuration information, service configuration information and protection configuration information.

In different network management systems, the ways of storing and accessing data in the management objects data area are different. Therefore, the implementing steps and ways of the data access interface module are different in different network management systems, and they have to be determined by the specific network management system.

5. The Application Interface Module, Which Can Also Be Called a Virtual NE Application Interface Module:

The virtual NE application interface module is the only interface provided to the outside by the virtual NE management sub-system. And it combines the application functions of the virtual NE device management module and the virtual NE service management module in the virtual NE management sub-system.

The circuit allocation, MSP, and other application modules of the network management system can implement the transparent management and function application of the virtual NE through the application interface module.

The interface functions provided by the virtual NE application module and the responding operations of the interface are shown in Table 5.

Abundant configuration information related with the virtual NE, including NE information, board information, service information, protection information, and etc. can be provided by the above application interface module. The network management system can simulate functions of the devices of other manufacturers more realistically, such as providing the displaying function of the virtual NE's panel graph, the displaying function of the virtual board channel graph, the service configuration function and the protection configuration function according to the configuration information. Therefore, the White-box virtual NE provides richer NE simulation information compared with the Black-box virtual NE and the Gray-box virtual NE.

Figure 4:
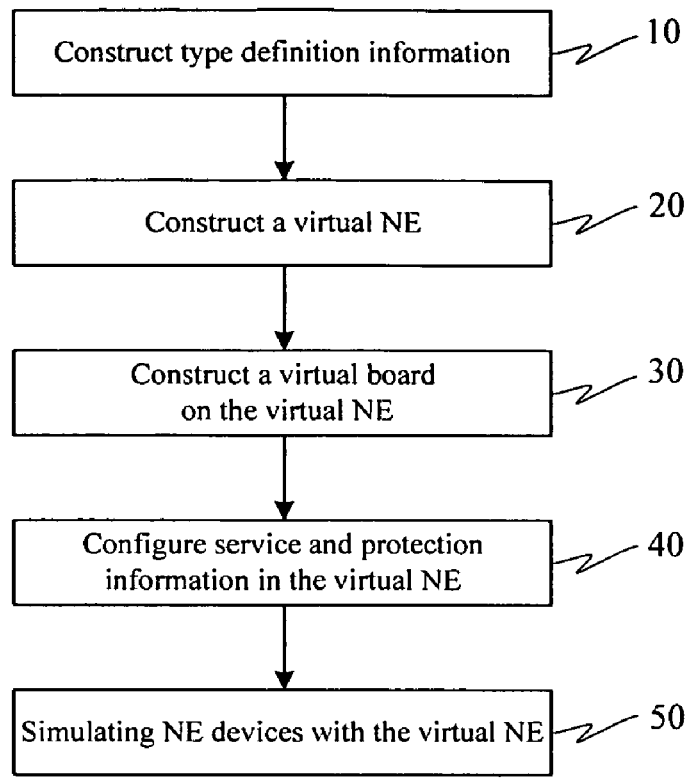
FIG. 4 is the flow chart of implementing a White-box virtual NE in accordance with an embodiment of the present invention.

As shown in FIG. 4, the main procedure of implementing a White-box NE includes the following steps:

Step 10: the virtual NE definition module in the network management system constructs the type definition information of the virtual NE and the virtual board and stores the information in a memory module according to the inputted type parameters of the virtual NE and the virtual board. The type definition information of the constructed virtual NE and the virtual board includes all the type parameters of an actual NE and an actual board of the same type. The type definition information of the constructed virtual NE and the virtual board is stored in the management objects data area of the

TABLE 5

| Interface functions | Input | Interface responding operations | Output |
| --- | --- | --- | --- |
| Query virtual NE information | No | Call a corresponding management function of the virtual NE device management module | NE information to be queried |
| Query virtual board information | No | Call a corresponding management function of the virtual NE device management module | board information to be queried |
| Construct service | Virtual NE ID, service ID, service source (including slot number, port number, channel number, time slot number), service destination (including slot number, port number, channel number, time slot number), service primary/secondary ID | Call a corresponding management function of the virtual NE service management module | Construct service |
| Delete service | Virtual NE ID Service ID | Call a corresponding management function of the virtual NE service management module | Delete service |
| Query service information | Virtual NE ID | Call a corresponding management function of the virtual NE service management module | Query service information |
| Construct protection | Virtual NE ID, protection ID, protection type, protection mapping (including mapping direction, slot number, port number, channel number), protection waiting resuming time, protection resuming mode | Call a corresponding management function of the virtual NE service management module | Construct protection |
| Delete protection | Virtual NE ID Protection ID | Call a corresponding management function of the virtual NE service management module | Delete protection |
| Query protection information | Virtual NE ID | Call a corresponding management function of the virtual NE service management module | Query protection information | network management system as the management objects together with the management information of other actual NEs.

Step 20: the virtual NE device management module reads the corresponding type definition information, and constructs a virtual NE entity in the management objects data area of the memory module in the network management system according to the type of the virtual NE to be constructed, wherein, the virtual NE entity includes a type ID and slots.

Step 30: the virtual NE device management module uses the virtual board type definition information to construct a virtual board entity in a designated slot of the designated virtual NE entity according to the type of the virtual board to be constructed, wherein the virtual board includes port type, port rate, port number and other information.

Step 40: the virtual NE service management module configures service and protection information on the constructed virtual NE entity.

Step 50: the network management system maintains devices and allocates services using the management feature of the devices of optical transport NE outside the management domain of the virtual NE.

Figure 5A:
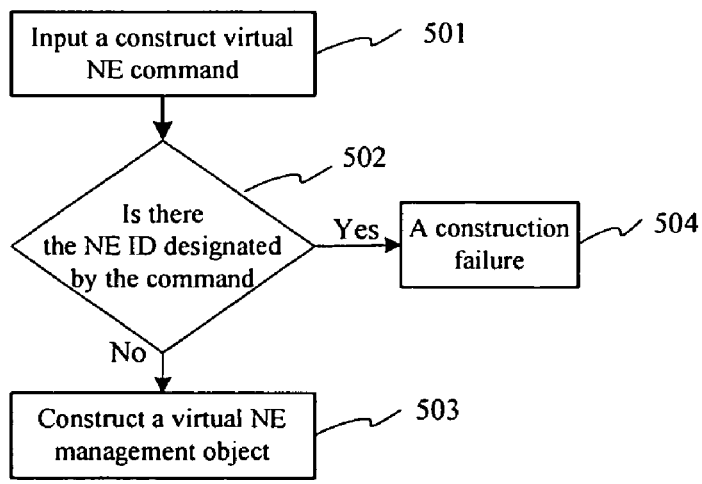
FIG. 5A is a flow chart of constructing a virtual NE.

The main procedure of constructing a virtual NE in Step 20 are shown in FIG. 5A, including the following steps:

Step 501: input a construct virtual NE command which includes a virtual NE ID, a virtual NE type ID and an NE name.

Step 502: check whether there is a virtual NE entity adopting the virtual NE ID in the command in the management objects data area, if there is such a virtual NE, proceed to Step 504; otherwise, proceed to step 503.

Step 503: find the virtual NE type definition information corresponding to the virtual NE ID, construct a virtual NE entity in the management objects data area according to the virtual NE type ID in the command, and give the designated virtual NE ID and NE name in the command to the virtual NE entity and end the current procedure of constructing a virtual NE.

Step 504: return a failure message, and jump out of the procedure.

Figure 5B:
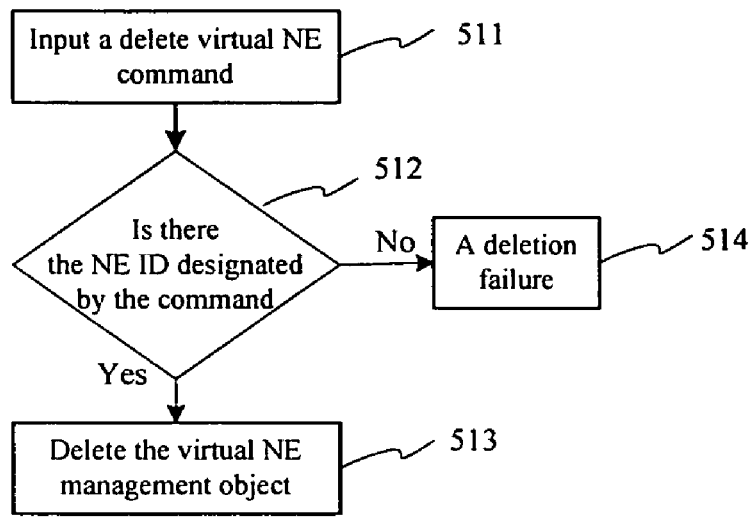
FIG. 5B is a flow chart of deleting a virtual NE.

If a certain virtual NE is no more needed, it can be deleted. The main procedure of deleting a virtual NE is shown in FIG. 5B, including the following steps:

Step 511: input a delete virtual NE command which includes the virtual NE ID corresponding to the virtual NE to be deleted;

Steps 512-514: check whether there is a virtual NE entity adopting the virtual NE ID in the command in the management objects data area, if there is no such a virtual NE, return a failure message; otherwise, call the data access interface module to delete the virtual NE entity corresponding to the virtual NE ID from the management objects data area.

The querying procedure of virtual NEs can be implemented by querying all the virtual NE entities in the management objects data area through data access interface and outputting the queried virtual NE.

Figure 6A:
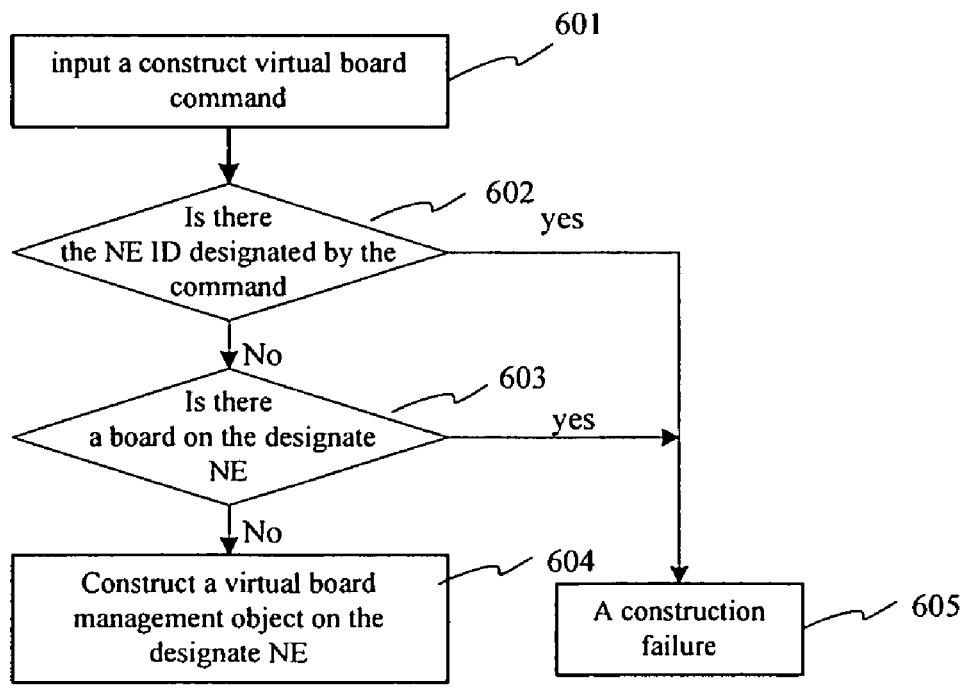
FIG. 6A is a flow chart of constructing a virtual board.

In the network management system of an optical network, like ordinary NEs, each virtual NE needs to be provided with the support of a panel graph, and a board channel graph. Therefore, a virtual board needs to be constructed after constructing the virtual NE. The procedure is implemented in Step 30 and is shown in FIG. 6A, including the following steps:

Step 601: input a construct virtual board command which includes a virtual NE ID, a slot number, a virtual board type ID and a virtual board ID.

Step 602: check whether there is a virtual NE entity adopting the virtual NE ID in the command in the management objects data area, if there is such a virtual NE, proceed to Step 605; otherwise, proceed to Step 603.

Step 603: check whether there is a virtual board in the slot corresponding to the slot number, if there is such a virtual board, proceed to Step 605; otherwise, proceed to Step 604.

Step 604: call the data access interface module to find the virtual board type definition information in the slot of the management objects data area that corresponds to the virtual board type ID in the command according to the inputted information, construct a virtual board entity in the management objects data area, give the designated virtual board ID in the command to the virtual board entity, and end the current procedure of constructing a virtual board.

Step 605: return a failure message, and jump out of the procedure.

Figure 6B:
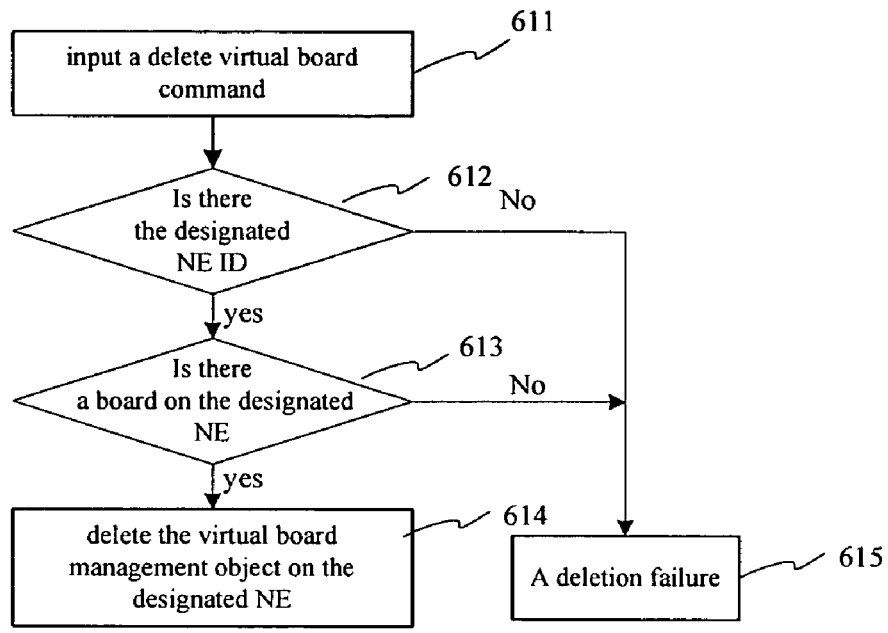
FIG. 6B is a flow chart of deleting a virtual board.

When there is a need for deleting a virtual board, the processing procedure is as shown in FIG. 6B, including the following steps:

Step 611: input a delete virtual board command which includes the virtual NE ID and slot number of the virtual NE to be deleted.

Step 612: check whether there is a virtual NE entity adopting the virtual NE ID in the command in the management objects data area, if there is such a virtual NE entity, proceed to Step 613; otherwise, proceed to Step 615.

Step 613: check whether there is a virtual board in the slot corresponding to the slot number, if there is such a virtual board, proceed to Step 614; otherwise, proceed to Step 615.

Step 614: call the data access interface, delete the virtual board entity in designated slot in the management objects data area and end the deleting procedure.

Step 615: return a failure message, and jump out of the procedure.

Figure 7A:
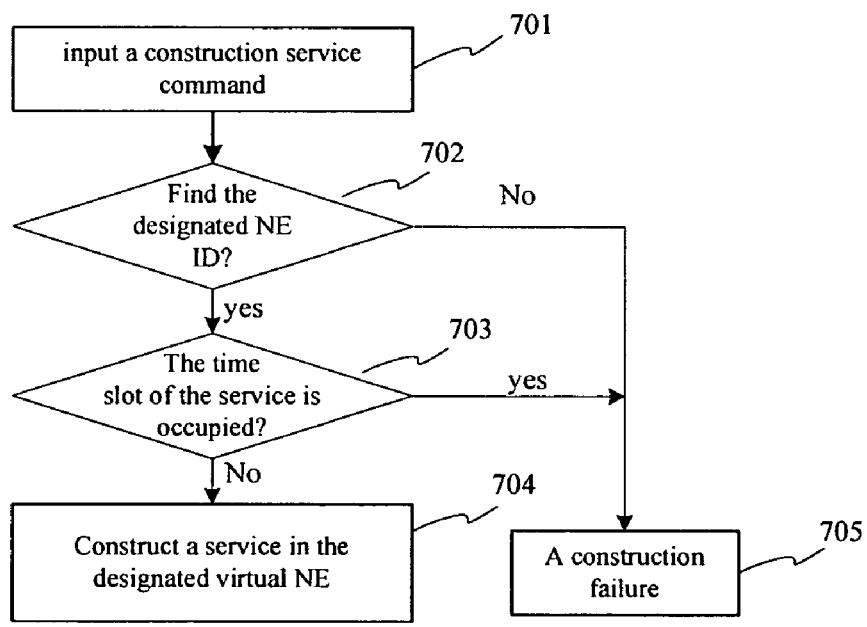
FIG. 7A is a flow chart of constructing a service.

As shown in FIG. 7A, the procedure of configuring service information in Step 40 includes the following steps:

Step 701: input a construct service command which includes a virtual NE ID, a service ID, a service source, a service destination and a service primary/secondary device ID, wherein the service source and service destination further include: slot number, port number, channel number and time slot number.

Step 702: check whether there is a virtual NE entity adopting the virtual NE ID in the command in the management objects data area, if there is such a virtual NE entity, proceed to Step 703; otherwise, proceed to Step 705.

Step 703: check whether there is a service source or a service destination in virtual NE entity occupying the time slot resources of the new service, if there is such a service source or such a service destination, proceed to Step 705; otherwise, proceed to Step 704.

Step 704: call the data access interface module to construct a new service in the management objects data area according to the information such as the service ID, the service source, the service destination, and the service primary/secondary ID in the command, and end the service configuration procedure.

Step 705: return a failure message, and jump out of the procedure.

Figure 7B:
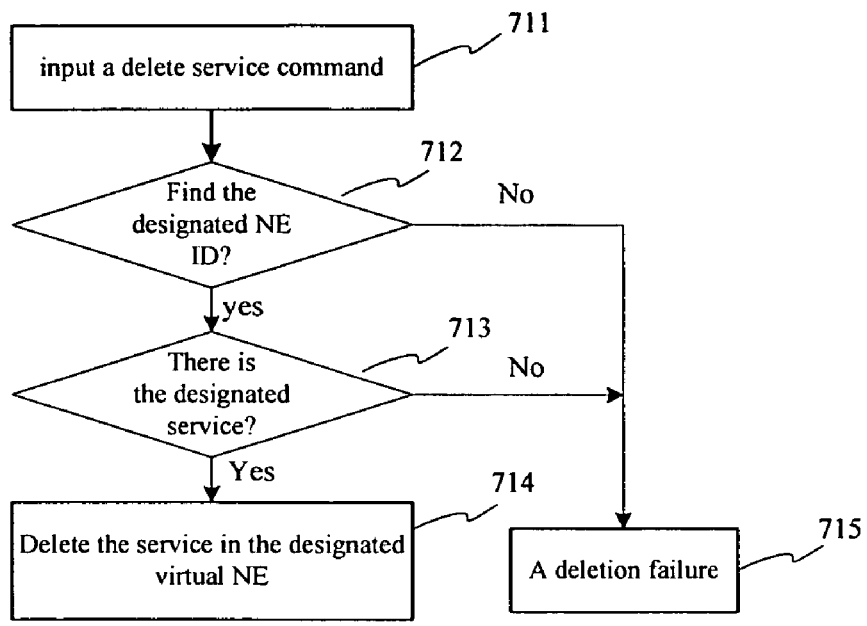
FIG. 7B is a flow chart of deleting a service.

As shown in FIG. 7B, the procedure of deleting a service includes the following steps:

Step 711: input the delete service command which includes the virtual NE ID and the service ID.

Step 712: check whether there is a virtual NE entity adopting the virtual NE ID in the command in management objects data area, if there is such a virtual NE entity, proceed to Step 703; otherwise, proceed to Step 705.

Step 713: check whether there is the designated service ID which is carried in the command in the designated virtual NE, if there is the designated service ID, proceed to Step 714; otherwise, proceed to Step 715.

Step 714: call the virtual NE data access interface, delete the designated service in the designated virtual NE from the management objects data area, and end the current procedure of deleting service.

Step 715: return a failure message, and jump out of the procedure.

Figure 8A:
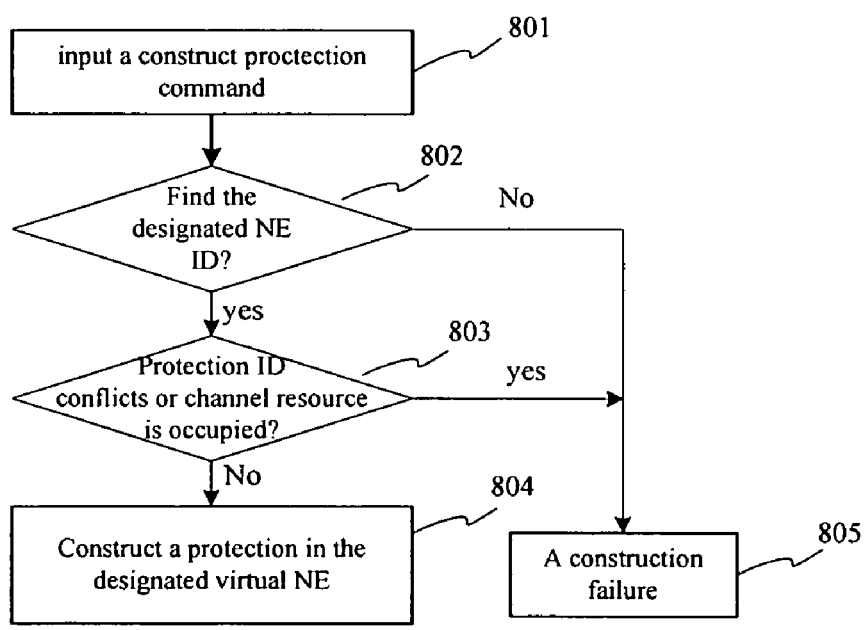
FIG. 8A is a flow chart of constructing a protection.

As shown in FIG. 8A, the procedure of configuring protection information in Step 40 includes the following steps:

Step 801: input a construct protection command which includes a virtual NE ID, a protection ID, a protection type, protection mapping, protection waiting resuming time and a protection resuming mode.

Step 802: check whether there is a virtual NE entity adopting the virtual NE ID in the command in management objects data area, if there is such a virtual NE entity, proceed to Step 803; otherwise, proceed to Step 805.

Step 803: check whether there is a conflict between the existing protection ID and the new constructed protection ID, or whether the existing protection occupies the channel resources of the mapping direction of the new protection, if so, proceed to Step 805; otherwise, proceed to Step 804.

Step 804: call the data access interface module to construct a new protection in the designated virtual NE in the management objects data area according to the information in the construct protection command, and end the configuration protection procedure.

Step 805: return a failure message, and jump out of the procedure.

Figure 8B:
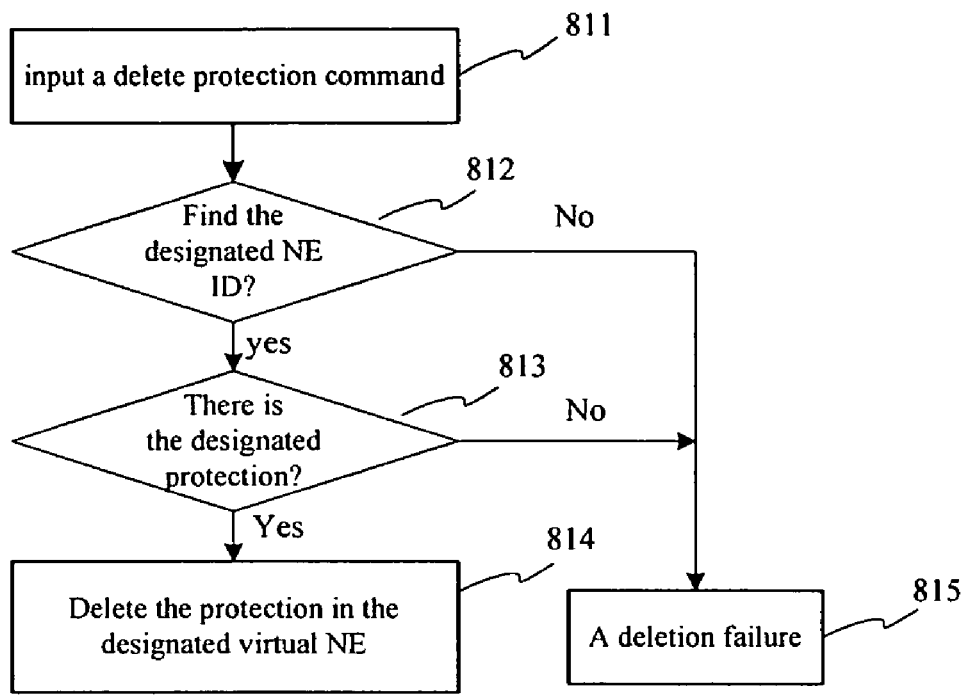
FIG. 8B is a flow chart of deleting a protection.

The procedure of deleting a protection is as shown in FIG. 8B, including the following steps:

Step 811: input a delete protection command which includes a virtual NE ID and a protection ID.

Step 812: check whether there is a virtual NE entity adopting the virtual NE ID in the command in management objects data area, if there is such a virtual NE entity, proceed to Step 813; otherwise, proceed to Step 815.

Step 813: check whether there is the protection ID designated by the command in the designated virtual NE, if there is the protection ID, proceed to Step 814; otherwise, proceed to Step 815.

Step 814: call the virtual NE data access interface module to delete the protection corresponding to the designated protection ID in the designated virtual NE from the management objects data area, and end the current procedure of deleting protection.

Step 815: return a failure message, and jump out of the procedure.

Figure 8C:
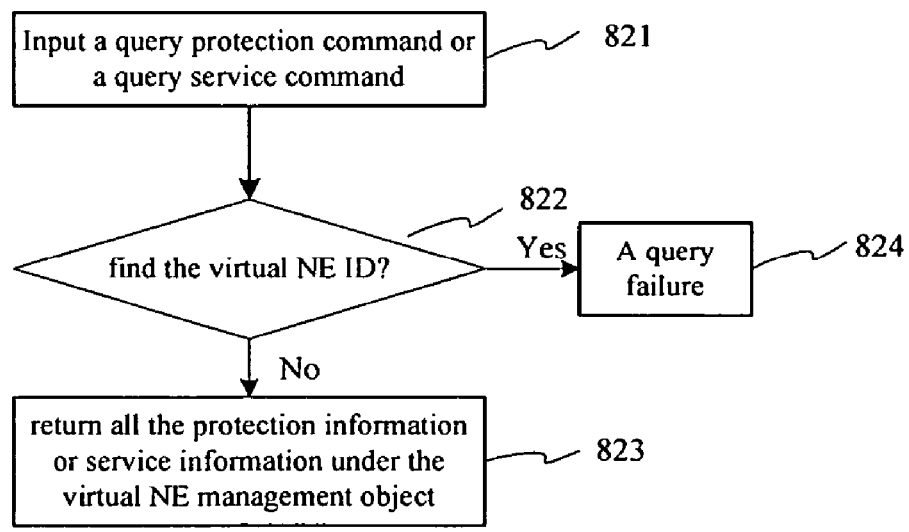
FIG. 8C is a flow chart of querying service information or protection information.

If there is a need for querying the constructed service information or protection information, the main procedure of querying the service information or protection information is shown in FIG. 8C, including the steps of:

Step 821: input a query protection command or a query service command including a virtual NE ID;

Steps 822-824: detect whether there is a virtual NE entity corresponding to the virtual NE ID which is carried in the command in the management objects data area; if there is such a virtual NE entity, return all the protection information or service information of the virtual NE entity; otherwise, return a failure message.

As can be seen from the above description, as being different from the Black-box and the Gray-box virtual NE, the White-box virtual NE according to the present invention can simulate all the functions and properties of an actual NE.

The embodiment of the present invention has the following features:

The problem that there can not be various kinds of virtual NEs coexisting in one network management system is solved.

The definition of the virtual NE and virtual board is supported. Thus, in one network management system, various kinds of virtual NEs and virtual boards can be defined such that the virtual NE can simulate an actual NE more realistically when devices of many manufacturers are networked together.

The network management system can provide a virtual NE panel graph and a virtual board channel graph according to the configuration information, namely, the virtual NE is an emulated NE. Thus the problem that there is a conflict in the maintenance and operation styles between the virtual NE and the ordinary NE is solved.

The installation, operation procedure and style of a virtual NE operated by network operating personnel are the same as those of the ordinary NE, thus the complicity of operations is reduced and the efficiency of network maintenance is enhanced.

A slot supporting virtual NE can be customized, which enables network operating personnel to configure the number of slots for the virtual NE according to the actual requirements and further increases the flexibility of management.

Flexible service and protection assigning functions of the virtual NE are supported, which enables network operating personnel to assign and manage for the virtual NE such protection modes as MS SPRING, Linear MSP and DNI, and further makes various kinds of protection management across management domains and flexible end-to-end circuit allocation possible.

The above description is only preferred embodiments of the present invention, and is not used to limit the protection scope of the present invention.

The invention claimed is:

1. A method for implementing a virtual Network Element (NE) implemented by a network management system of an optical network, comprising:

constructing and storing virtual NE type definition information in the network management system, each type of which includes type parameters of an actual NE of the same type;

constructing and storing virtual board type definition information in the network management system, each type of which includes type parameters of an actual board of the same type;

deciding the type of a virtual NE to be constructed;

reading the corresponding virtual NE type definition information;

constructing, in a data area of a management object, a virtual NE entity, which has property information of an actual NE;

deciding the type of a virtual board to be constructed;

reading the corresponding virtual board type definition information;

constructing, in a designated slot of the constructed virtual NE entity, a virtual board entity which has property information of an actual board;

configuring service information and protection information for the constructed virtual NE entity; and implementing a virtual NE device maintenance and a service allocation in the network management system by simulating the management features of an actual NE device.

2. The method according to claim 1, further comprising:
storing the type definition information of the constructed virtual NE and the virtual board as a management object in the management objects data area of the network management system together with management information of other NEs in the network.

3. The method according to claim 1, wherein the step of constructing a virtual NE entity comprises:
inputting a construct virtual NE command, which comprises a virtual NE ID, a virtual NE type ID and an NE name;
checking whether there is a virtual NE entity adopting the designated virtual NE if in the command in the management objects data area;
if there is such a virtual NE entity, returning a failure message and ending the procedure; and
if there is no such a virtual NE entity, finding the corresponding virtual NE type definition information according to the virtual NE type ID to construct a virtual NE entity in the management objects data area, and giving the designated virtual NE ID and the NE name in the command to the virtual NE entity.

4. The method according to claim 1, wherein the step of constructing a virtual board comprises:
inputting a construct virtual board command, which comprises a virtual NE ID, a slot number, a virtual board type ID and a virtual board ID;
checking whether there is a virtual NE entity adopting the designated virtual NE ID in the command in the management objects data area;
if there is such a virtual NE entity, checking whether there is a virtual board entity in the slot corresponding to the designated slot number, if there is such a virtual board, returning a failure message and ending the procedure; otherwise, finding the corresponding virtual board type definition information according to the virtual board type ID to construct a virtual board entity in the management objects data area, and giving the designated virtual board ID in the command to the virtual board entity; and
if there is no such a virtual NE entity, returning a failure message and ending the procedure.

5. The method according to claim 1, wherein the step of configuring service information comprises:
inputting a construct service command, which comprises a virtual NE ID, a service ID, a service source, a service destination and a service primary/secondary ID;
checking whether there is a virtual NE entity adopting the designated virtual NE ID in the command in the management objects data area;
if there is such a virtual NE entity, checking whether there is a service source or a service destination occupying the time slot resources of the new service in the virtual NE entity, if there is such a service source or a service destination, returning a failure message and ending the procedure; otherwise, constructing a new service in the management objects data area according to the inputted information in the command; and
if there is no such a virtual NE entity, returning a failure message and ending the procedure.

6. The method according to claim 1, wherein the step of configuring protection information comprises:
inputting a construct protection command which comprises a virtual NE ID, a protection ID, a protection type, protection mapping, protection waiting resuming time and a protection resuming mode;
checking whether there is a virtual NE entity adopting the designated virtual NE ID in the command in the management objects data area;
if there is such a virtual NE entity, checking whether there is a conflict between an existing protection ID and the protection ID to be constructed, or whether there is an existing protection occupying the channel resources in the mapping direction of the new protection, if so, returning a failure message and ending the procedure; otherwise, constructing a new protection in the management objects data area according to the inputted information in the command; and
if there is no such a virtual NE entity, returning a failure message and ending the procedure.

7. The method according to claim 1, wherein the type parameters of the virtual NE type definition information comprise: a virtual NE type ID, a virtual NE type name, a virtual NE type,
number of slots, rate of interface rate, and functions of NE;
the type parameters of the virtual board
type definition information comprise: a virtual board type ID, a virtual board type name, type of interface, rate of interface and number of interfaces.

8. The method according to claim 1, further comprising:
obtaining and outputting the information of a designated virtual NE, virtual board, service, or protection from the management objects data area according to an inputted query command.

9. The method according to claim 1, further comprising:
deleting the information of a designated virtual NE, virtual board, service, or protection from the management objects data area according to an inputted delete command.

10. A network management system for implementing a virtual NE, comprising:
an application module;
a memory module which is used to store management objects data;
a virtual NE definition module;
a virtual NE device management module;
a virtual NE service management module;
a data access interface module; and
an application interface module;
wherein the virtual NE definition module is adapted to construct virtual NE type definition information and virtual board type definition information; store the constructed virtual NE type definition information and the virtual board type definition information in the memory module through the data access interface module; and provide the required type definition information to the virtual NE device management module;
the virtual NE device management module is adapted to obtain the virtual NE type definition information and the virtual board type definition information from the virtual NE definition module; and call the data access interface module to construct a virtual NE entity and a virtual board entity in the management objects data area of the memory module; and
the virtual NE service management module is adapted to construct the service information and protection information of a virtual NE entity in the management objects data area of the memory module through the data access interface module; and provide a service management and protection function for the application module through the application interface module.

11. The system according to claim 10, wherein the virtual NE device management module is further adapted to receive a delete command, a query command or a modify command from the application module through the application interface module; and implement the deleting or querying operation on the information of the constructed virtual NE entity and virtual board entity, or the service information, or the protection information in the management objects data area of the memory module through the data access interface module.

* * * * *

UNITED STATES PATENT AND TRADEMARK OFFICE
CERTIFICATE OF CORRECTION

PATENT NO.         : 7,664,051 B2
APPLICATION NO.    : 11/578449
DATED              : February 16, 2010
INVENTOR(S)        : Yong Zhang Page 1 of 1

It is certified that error appears in the above-identified patent and that said Letters Patent is hereby corrected as shown below:

Claim 3, line 7, after "NE" insert --ID--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,664,051 B2  Page 1 of 1
APPLICATION NO. : 11/578449
DATED : February 16, 2010
INVENTOR(S) : Yong Zhang It is certified that error appears in the above-identified patent and that said Letters Patent is hereby corrected as shown below:

Column 15, Claim 3, line 13, after "NE" insert --ID--.

This certificate supersedes the Certificate of Correction issued May 4, 2010.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,664,051 B2  Page 1 of 1
APPLICATION NO. : 11/578449
DATED : February 16, 2010
INVENTOR(S) : Yong Zhang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 235 days.

Signed and Sealed this

Twenty-eighth Day of December, 2010

David J. Kappos
*Director of the United States Patent and Trademark Office*